Figure 1:
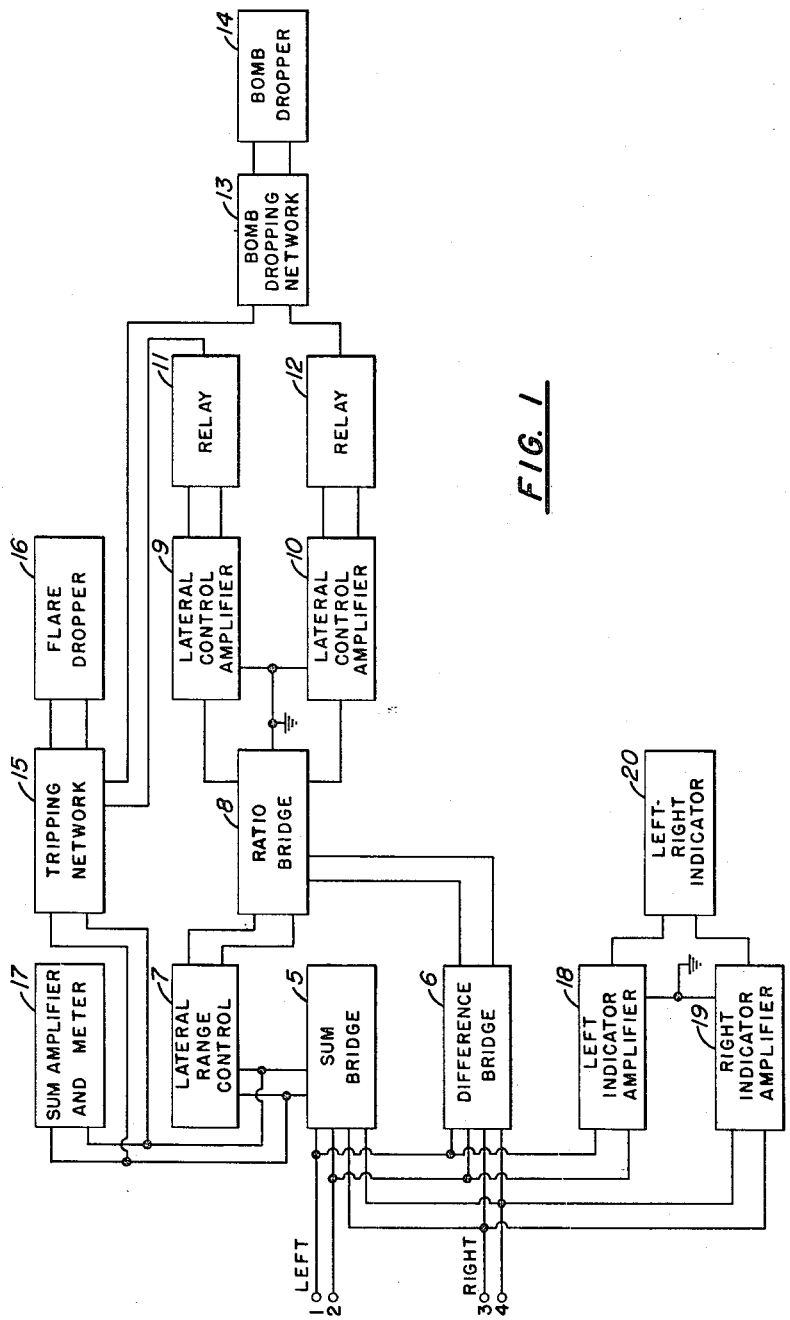

INVENTOR
JAMES H. STEIN
ATTORNEYS

2,741,158

SELECTIVE AUTOMATIC MISSILE RELEASE

James H. Stein, Garden City, N. Y., assignor to the United States of America as represented by the Secretary of the Navy Application August 8, 1944, Serial No. 548,578

12 Claims. (Cl. 89—1.5)

This invention relates to an improved automatic missile release, and more particularly to a system adapted for use in selectively releasing missiles of different types for the purpose of marking the locality of or destroying a magnetic target.

It is well known that as any magnetometer of fixed orientation is translated relative to a non-uniform magnetic field, such as that from a submarine or other magnetic object, it will indicate increases and decreases in the component of the field which it measures. It is also well known that, in any plane of given altitude above a dipole, the regions of increased or decreased field component attain corresponding maximum and minimum values of field strength, falling off gradually in all directions in said plane from the maximum, just as the elevation of a conical hillside decreases the farther the distance from the apex. These positions of maximum and minimum field strength may conveniently be called the positive and negative "peaks" of the magnetic anomaly, and will be so termed herein. In general, there are two or more such peaks associated with any magnetic object but usually one or two of these peaks are much more prominent than the others.

The exact location of the anomaly peaks with respect to the center of the target dipole depends on the orientation of the dipole, the altitude of the magnetometer, and the orientation of the magnetometer.

The relative positions of the anomaly peaks and the associated magnetic objects are defined by well-understood physical and geometric principles. Accordingly, some means which enables the aircraft to determine its position relative to one of the anomaly peaks will, in combination with a knowledge of certain other conditions, permit the observer to determine his position with respect to the target.

Highly effective systems adapted for indicating the presence of a magnetic body in the proximity of an aircraft have been devised. Certain of these arrangements employ magnetometers of the saturated-core type, the magnetometer element being maintained in alignment with the earth's magnetic field regardless of movements of the aircraft by means of a stabilization system, as for example that disclosed in copending application Serial No. 529,003, filed March 31, 1944, Magnetic Stabilization System, Donald G. C. Hare, now Patent No. 2,689,333, issued September 14, 1954. The signals from two such magnetometers have been employed in the past to provide an indication as to the lateral displacement of the magnetic target with respect to the aircraft, as disclosed in copending application Serial No. 531,422, filed April 17, 1944, Directional Indicator System, Victor V. Vacquier and John N. Adkins, now Patent No. 2,605,341, issued July 29, 1952.

Early attempts to apply such detection means to the problem of missile release included arrangements in which the release of the missile depended solely upon the amplitude of the magnetometer output signal, the assumption being that this amplitude achieved a maximum value when the aircraft was directly over the magnetic target. Experiments showed, however, that such a simple solution of the problem was not entirely satisfactory.

It was realized early that a single magnetometer was incapable of providing sufficient information to permit accurate automatic missile release. Furthermore, if the missiles were bombs, their relatively high cost and great weight made it essential that the automatic system be substantially nonresponsive to magnetic "noise" as distinguished from magnetic anomalies due to the presence of a magnetic target. Another problem which was early encountered was the wide variation in strength of the magnetic field surrounding the target. This unpredictable variation prohibited satisfactory operation based solely upon the magnitude of the magnetometer signals.

In my copending application Serial No. 543,505, filed July 7, 1944, Bombing Control, James H. Stein, a method of and means for securing automatic bombing control are disclosed which are capable of overcoming the above disadvantages of previously known arrangements to a large extent. The present invention represents an improvement over the disclosure of my earlier application, particularly with respect to the range of input signal strength to which the system is fully responsive, as well as the provision of the feature of selective missile release.

It is an object of this invention, therefore, to present an improved method and means for automatically determining whether the course of the aircraft passes directly over an anomaly peak or whether that course is to the right or the left of the apex of the peak.

It is a further object of the present invention to provide a missile release which is selectively capable of dropping missiles of different types, as for example flares or bombs, depending upon the proximity of the aircraft to the target.

It is a still further object of this invention to provide a means for the selective release of different types of missiles such as flares or bombs, such that if the course of the aircraft be directly over the anomaly peak or within some pre-determined tolerance, a bomb will be released, while on the other hand, if the course of the aircraft be to the right or the left of the apex by more than a certain predetermined amount, then a flare will be released to mark the location of the pass while the bombs will be retained until a more accurate pass can be made.

It is necessary that the equipment respond to either a positive or a negative anomaly peak since the pilot has no way of telling in advance what the polarity will be. In previous equipment, response to signals of either polarity was obtained by rectifying the sum and difference of the signals and then comparing the rectified sum and difference for relative size. The disadvantage of that method consists of the fact that the rectifier will not accommodate very large or very small signals without serious distortion. If the signal is too large, it overloads the rectifier, whereas if the signal is too small, the finite threshold of the rectifier will "chop off" a portion or all of the signal. Either of these conditions will cause a distortion of the amplitude, thereby rendering inaccurate any comparison of the sum and difference amplitudes which is made subsequent to rectification.

The principal advantage of the present invention over the previous similar device is that it provides a means for comparing the relative amplitudes of 2 signals without the necessity for rectifying them first, thereby permitting a more accurate comparison to be made.

The above and other objects of the invention are achieved by utilizing the signals from a pair of substantially identical magnetometers, the magnetometer elements of which are displaced from each other on a transverse axis of the aircraft. The sensitivity of the arrangement in accordance with the invention is such that the exact displacement of the magnetometer elements is in no sense critical. In general, however, the maximum displacement which can conveniently be achieved is desirable. If the missile release is installed in an airplane, for example, it is preferable that the magnetometer elements be mounted respectively at or near its wing tips. Where the control is installed in an aircraft of the lighter-than-air type, the magnetometer elements are preferably mounted at either side of the gas bag.

The magnetometers referred to may be simply coils of wire having a high product of turns times area, or NA. They may be mounted rigidly in the aircraft such that the axes are vertical in level flight. They might be connected through amplifiers to the two inputs of the subject invention. Such an arrangement, while of limited suitability due to the spurious indications which would arise from any deviation of the aircraft from a condition of level flight, will, however, fulfill the requirements of the first and second input signals referred to herein.

A more satisfactory type of magnetometer, stabilized automatically in a position parallel to the direction of the earth's field, is described in application of Serial No. 529,003, filed March 31, 1944, Magnetic Stabilization System, Donald G. C. Hare, now Patent No. 2,689,333.

The magnetometers are connected, through input terminals, to a network of resistors which perform the functions of deriving the sum and the difference of the two magnetometer signals. There is also means whereby the sum may be attenuated by some selected amount in order to establish the particular criterion desired but for simplicity in this description the word "sum" is hereby defined to mean either the true sum or the attenuated sum.

The circuit may employ a pair of lateral control amplifiers, one amplifier having applied to it the sum and difference added with unlike polarity, while the other having applied to it the sum and difference added with like polarities. The purpose of lateral control amplifiers is merely to operate relays in accordance with the polarity of the applied impulses. If sufficiently sensitive polarized relays are available, the lateral control amplifiers may be omitted.

It will be understood that when the aircraft passes directly over the anomaly peak, the signals from the two magnetometers will be essentially of equal amplitude, while if the course of the aircraft is to one side of the peak, the signals will be unequal. The way that this amplitude difference is used to operate the circuit is best explained mathematically.

Let A and B represent the two magnetometer signals. The criterion for release of bombs is that A be greater than KB or that B be greater than KA (where K is a factor whose value may be adjusted depending upon the conditions). It is convenient, therefore, to use the relationship between the sum and the difference of the signals as a criterion.

Hence, the sum, $S = A + B$
and the difference, $D = A - B$

The signals A and B may each be of either positive or negative polarity.

If A and B are nearly equal, the difference will be small compared to the sum. If A and B are widely different in amplitude, the difference will more nearly equal the sum. Accordingly, the ratio of the sum to the difference is a convenient criterion.

This criterion is established electrically by attenuating the sum by a factor numerically equal to the critical ratio desired, then comparing the attenuated sum with the difference and determining which is the larger. Mathematically, let $$\frac{S}{K} = \text{the attenuated sum}$$

where K is subject to adjustment. Then, if $$\frac{S}{K}$$

is greater than D in absolute value, the distance of the course of the aircraft from the anomaly peak is known to be within some definite tolerance as determined by the value of K used. On the other hand, if $$\frac{S}{K}$$

is less than D in absolute value, then this distance is beyond the desired tolerance.

The method whereby this comparison is made without the need for rectifying the sum or difference will be clear from a consideration of the polarities of the impulses applied to the lateral control amplifier in each of the following cases.

| Conditions | | | Polarities | | | | | |
|---|---|---|---|---|---|---|---|---|
| Case No. | A or B Larger | $\frac{S}{K}$ or D Larger | A | B | $\frac{S}{K}$ (A+B) | D (A−B) | Channel #1 $\frac{S}{K}$−D | Channel #2 $-\frac{S}{K}$−D |
| 1 | A | S/K | + | + | + | + | + | − |
| 2 | A | S/K | − | − | − | − | − | + |
| 3 | A | D | + | + | + | + | − | − |
| 4 | A | D | − | − | − | − | + | + |
| 5 | B | S/K | + | + | + | − | + | − |
| 6 | B | S/K | − | − | − | + | − | + |
| 7 | B | D | + | + | + | − | + | + |
| 8 | B | D | − | − | − | + | − | − |
| 9 | A | D | + | − | + | + | − | − |
| 10 | A | D | − | + | − | − | + | + |
| 11 | B | D | + | − | − | + | − | − |
| 12 | B | D | − | + | + | − | + | + |
| 13 | A=B | D | + | − | 0 | + | − | − |

It will be seen that in cases 1, 2, 5 and 6 where the ratio of S to D is within the tolerance $$\frac{S}{K}$$

is greater than D in absolute value, then the polarities in the last two columns are of opposite sign. However, when $$\frac{S}{K}$$

is less than D in absolute value as in cases 3, 4, 7 to 13, the polarities in the last two columns are identical.

In the subject invention, the polarities in the final two columns are made to operate relays such that when the polarities are unlike, only one relay but not both is operated and the bomb circuit is armed, while when the polarities are alike, both relays operate or neither relay operates, and the bomb circuit is not armed in either case. It will be noted that no rectification of signals is used, so that there can be no distortion of relative amplitudes.

It is necessary that the instrument distinguish between a signal and noise. This is accomplished by the inclusion of means to analyze the characteristics of the sum signal and to actuate a relay only in case said signal is of such shape and timing that it could be caused by the magnetometers passing in the vicinity of a magnetic target. The means for performing this function is indicated on the drawing as the "tripping network."

This analysis of a signal, whether it be performed by manual or automatic means, results in an initiation of the first output signal referred to above. The second output signal consists of a quantity represented by the attenuated sum minus the difference. The third output signal is the negative attenuated sum minus the difference. It will be evident, therefore, that in order for the combination of the output signals to be such that a bomb is released, the aircraft must pass directly over a peak of the magnetic anomaly or within some critical amount thereof. By a suitable choice of heading and other tactics, it is possible for the pilot to cause the course of the aircraft to be such that, if it should cross the anomaly peak it would also come within bombing range of the target. This can be done since the relationship between the positions of the anomaly peak and of the target is subject to well-known physical laws and can, therefore, be predicted to the extent that the conditions are known. Examples of tactical measures which contribute to the effectiveness of the bombing are such items as (a) establishing the proper heading (b) the choice of a suitable delay between the time of crossing the anomaly peak and the instant of release of the bombs, and (c) the use of a barrage of bombs, released in a favorable pattern.

In addition to the basic elements above pointed out, the missile release in accordance with this invention includes means for providing visual indication both of the presence of any signal and of the lateral displacement of the aircraft with respect to the magnetic anomaly. Such visual indications are of substantial aid to the pilot of the aircraft in conducting hunting maneuvers.

For a better understanding of the invention, together with other and further objects thereof, reference is made to the following description taken in connection with the accompanying drawings, and its scope will be pointed out in the appended claims.

Figure 2:
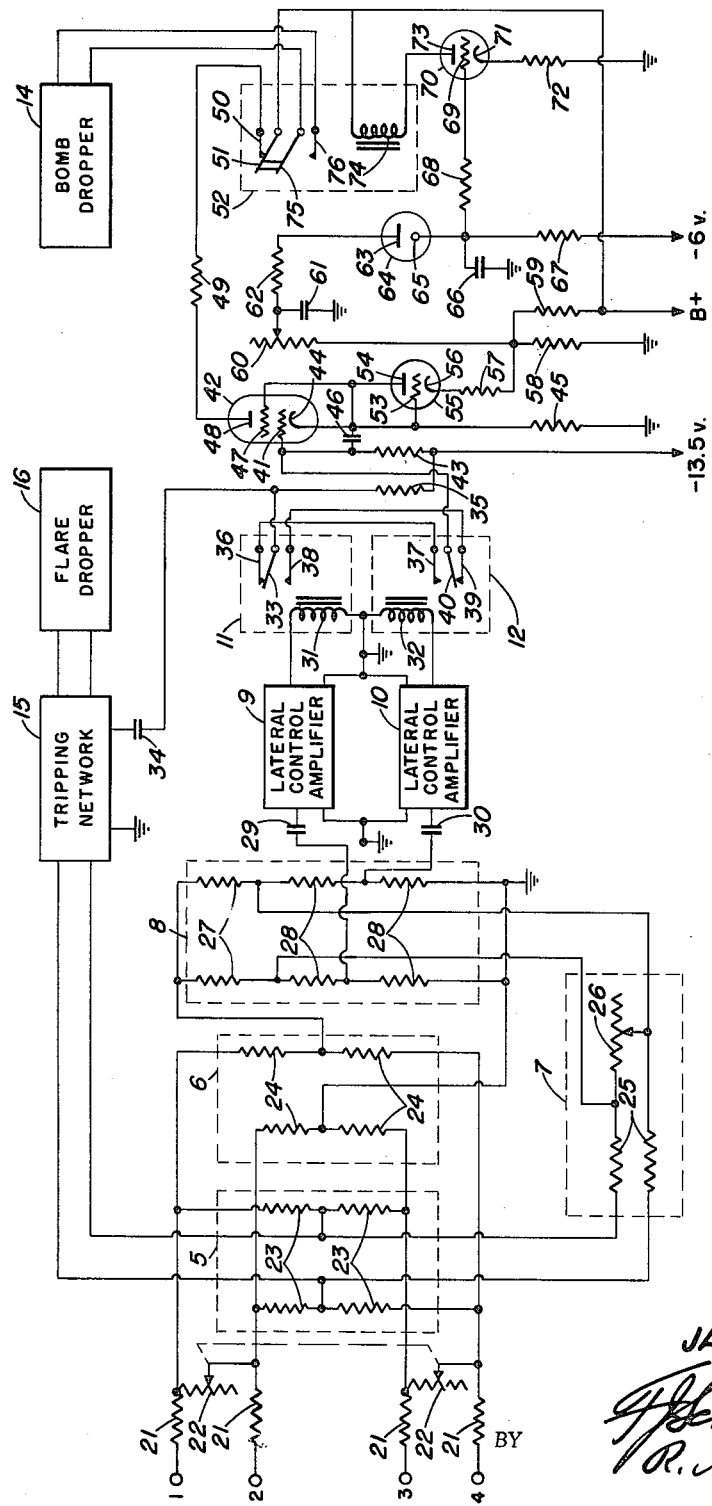

In the accompanying drawings:

Fig. 1 shows, in block form, a bombing control in accordance with the present invention; and Fig. 2 shows, in block and schematic form, the major elements of the bombing control of Fig. 1.

Referring now to Fig. 1, there is shown a missile release having two pairs of input terminals 1—2 and 3—4. Both pairs of input terminals are connected to sum bridge 5 and to difference bridge 6, with the result that the output of sum bridge 5 comprises a voltage proportional to the sum of the voltages applied to input terminals 1—2 and 3—4, whereas the output of difference bridge 6 comprises a voltage proportional to the difference of these two input signals.

The output of sum bridge 5 is supplied through lateral-range control 7 to ratio bridge 8. The output of difference bridge 6 is supplied directly to ratio bridge 8. The two output voltages of ratio bridge 8 are supplied respectively to lateral-control amplifiers 9 and 10, the outputs of which are connected respectively to relays 11 and 12. Bomb-dropping network 13 includes in its input circuit relays 11 and 12, and its output is supplied to bomb dropper 14.

The output of sum bridge 5 is also supplied to tripping network 15, a portion of which is included in the input circuit of bomb-dropping network 13. The output of tripping network 15 is connected to flare dropper 16.

As auxiliary equipment, a sum amplifier and meter unit 17 is connected to the output of sum bridge 5. Indicator amplifiers 18 and 19 are connected respectively to input terminals 1—2 and 3—4, and the outputs of these amplifiers are connected to indicator 20.

In operation, a pair of magnetometers, not shown, having their sensitive elements displaced laterally on the aircraft and each having its output circuits balanced with respect to ground, are connected respectively to input terminals 1—2 and 3—4. Sum bridge 5 provides an output voltage proportional to the sum of the two magnetometer output voltages. This sum voltage, after being subjected to an adjustable degree of attenuation in lateral-range control 7, is applied to ratio bridge 8. A voltage proportional to the difference of the two magnetometer output voltages, which is derived by difference bridge 6, is also applied to ratio bridge 8.

Depending upon the relative magnitudes and polarities of the sum and difference input voltages to ratio bridge 8, one or both of the output voltages from this bridge may exceed the threshold value of amplifiers 9 and 10, thereby causing actuation of either or both of the corresponding relays 11 and 12. Relays 11 and 12 are so interconnected that they operate to close the input circuit to bomb-dropping network 13 only when either but not both of the output voltages of ratio bridge 8 exceeds the threshold value of amplifiers 9 and 10. This occurs when the ratio of the sum signal to the difference signal exceeds a predetermined minimum value. Operation is independent of the polarities of the sum and difference signals, due to the provision of two output channels either of which alone may initiate actuation of the missile release. Under this condition, the missile release is ready to release a bomb provided the magnetometer output signals supplied to input terminals 1—2 and 3—4 have desired characteristics. If the difference signal is almost equal to or exceeds the attenuated sum signal, on the other hand, both relays are actuated and hence the release of a missile is not initiated.

It is a function of tripping network 15, to which the sum signal is supplied, to determine whether the input signals have the desired characteristics. This unit may have any degree of complexity from manual operation upward. In the simplest form, it can consist of an indicator such as a meter, an observer, and an electric switch; in operation, the observer notes the characteristics of the sum signal and if they are of such shape, amplitude and duration as to indicate that the signal could have been caused by the appropriate magnetic target, he closes the electric switch thereby initiating the first output signal, actuating the flare dropper and providing an impulse to actuate the bomb dropping network, subject, of course, to automatic control by the second and third output signals.

Suitable forms of automatic means of accomplishing this analysis are the subjects of certain co-pending applications. If this circuit is arranged and operates in accordance with the disclosure of copending application Serial No. 547,477, filed July 31, 1944.

Tripper System, Otto H. Schmitt, an impulse is provided at the peak or inflection point of the magnetometer output signals. Improved performance may be realized under certain conditions by utilizing the disclosure of copending application Serial No. 543,494 filed July 4, 1944, Automatic Release and Reset System, William I. L. Wu, now Patent No. 2,640,926, issued June 2, 1953, which operates by comparing different derivative outputs obtained from the magnetometer signals. In either case, the impulse obtained, when impressed upon the input of bomb-dropping network 13, causes the latter to operate and energize bomb dropper 14. Tripping network 15 also serves to actuate flare dropper 16, so that flares may be dropped irrespective of whether the output of ratio bridge 8 is such that the release of a bomb is indicated.

Sum amplifier and meter unit 17, while not an essential part of the invention, is provided to aid the operator both in navigation and in checking the performance of the automatic equipment. Likewise, amplifiers 18 and 19 and indicator 20 are primarily for the purpose of giving the operator useful information for navigational purposes.

Reference is now made to Fig. 2 of the drawings, which shows in additional detail the major elements of the missile release of Fig. 1. In Fig. 2, input terminals 1—2 and 3—4 are each connected, through series resistors 21, to the inputs of sum bridge 5 and of difference bridge 6. The inputs to these bridges, from each pair of input terminals, are shunted by rheostats 22, and these rheostats are ganged in opposition. Sum bridge 5 comprises resistors 23, arranged as shown in Fig. 2 of the drawings, and difference bridge 6 comprises resistors 24, the arrangement of which is also shown in Fig. 2.

The output terminals of sum bridge 5 are connected to the input of tripping network 15, which in turn supplies flare dropper 16, and also to lateral-range control 7. The latter comprises series resistors 25 and rheostat 26. The output of lateral-range control 7 is connected to one pair of the input terminals of ratio bridge 8. The other pair of input terminals of this ratio bridge is connected to the output terminals of difference bridge 6.

Ratio bridge 8 comprises resistors 27 and 28, arranged as shown in Fig. 2. The output terminals of ratio bridge 8 are connected, through capacitors 29 and 30, to lateral-control amplifiers 9 and 10, the output terminals of which are connected to windings 31 and 32, respectively, of single-pole, double-throw relays 11 and 12.

Moving contactor 33 of relay 11 is connected, through capacitor 34, to tripping network 15 and also, through resistor 35, to a source of negative potential indicated by —13.5 v. Normally closed contact 36 of relay 11 is connected to normally open contact 37 of relay 12. Normally open contact 38 of relay 11 is connected to normally closed contact 39 of relay 12. Moving contactor 40 of relay 12 is connected to control grid 41 of arc-discharge tube 42 and also, through resistor 43, to the source of —13.5 v. Cathode 44 of arc-discharge tube 42 is grounded through resistor 45. Capacitor 46 is connected between control grid 41 and cathode 44 of arc-discharge tube 42, screen grid 47 of which is connected to cathode 44.

Anode 48 of arc-discharge tube 42 is connected, through series resistor 49 and the normally closed pair of contacts 50 and 51 of relay 52, to a source of positive potential indicated by B+. Cathode 44 of arc-discharge tube 42 is also connected to grid 53 and plate 54 of vacuum tube 55, cathode 56 of which is grounded through resistors 57 and 58 in series. The junction of resistors 57 and 58 is connected through resistor 59 to B+, and is also connected to one terminal of rheostat 60, the other terminal of which is by-passed to ground by capacitor 61 and connected through resistor 62 to anode 63 of voltage-regulator tube 64. Cathode 65 of tube 64 is by-passed to ground by capacitor 66, and is connected through a series resistor 67 to a source of negative potential indicated by —6 v. Cathode 65 is also connected through series resistor 67 to a source of neg-tube 70, cathode 71 of which is grounded through resistor 72. Plate 73 of vacuum tube 70 is connected, through winding 74 of relay 52, to B+. Normally open contacts 75 and 76 of relay 52 are connected to bomb dropper 14.

In operation, rheostats 22, which are ganged in opposition, are adjusted so that substantially equal signal voltages are applied to the inputs of sum and difference bridges 5 and 6 when the magnetometers connected respectively to input terminals 1—2 and 3—4 are subjected to substantially equal magnetic fields. The output voltage of sum bridge 5 is applied to tripping network 15, which preferably is arranged and operates in accordance with the disclosure of copending application Serial No. 543,494, filed July 4, 1944, Automatic Release and Reset System, William I. L. Wu, now Patent No. 2,640,926, issued June 2, 1953. The output voltage of sum bridge 5 is also supplied to lateral-range control 7, which serves to select a desired portion of the sum voltage for application to one pair of input terminals of ratio bridge 8, depending upon the lateral displacement within which release of a missile is to occur. The full output voltage of difference bridge 6, however, preferably is applied to the appropriate input terminals of ratio bridge 8.

Ratio bridge 8 functions to provide two output voltages with respect to ground. The presence of these voltages and their magnitudes depend upon the relative magnitudes of the sum and difference signals, which in turn are a function of the relative polarities and magnitudes of the magnetometer output signals, as explained above in connection with Fig. 1 of the drawings.

Before the missile release can operate to release a missile, either of the output voltages of ratio bridge 8, but not both, must exceed the threshold voltage of lateral-control amplifiers 9 and 10. Whether this condition is fulfilled, when a given pair of input signals are applied respectively to input terminals 1—2 and 3—4, depends upon whether or not the ratio of the sum signal to the difference signal exceeds a predetermined magnitude, the value of this ratio being independent of the polarities of the sum and difference signals but dependent in turn upon the relative polarities and magnitudes of the input signals.

Relays 11 and 12, windings 31 and 32 of which are connected respectively in the output circuits of lateral-control amplifiers 9 and 10, have their contacts so interconnected that a voltage developed across resistor 35 can be applied to control grid 41 of arc-discharge tube 42 only when either one, but not both, of the relays is energized. Relays 11 and 12 are energized when the corresponding output voltages of ratio bridge 8 exceed the threshold voltage of lateral-control amplifiers 9 and 10. It will be apparent, therefore, that a voltage developed across resistor 35 may be applied to control grid 41 of arc-discharge tube 42 when either, but not both, of the output voltages of ratio bridge 8 exceeds the threshold voltage of lateral-control amplifiers 9 and 10.

A voltage is developed across resistor 35 when the input voltages applied to terminals 1—2 and 3—4 are of such minimum amplitude and characteristic shape as to actuate tripping network 15, to which resistor 35 is connected through capacitor 34. The voltage applied to capacitor 34 by tripping network 15, under these circumstances, is approximately a square pulse, the duration of which is determined by the adjustment of tripping network 15. Capacitor 34 and resistor 35 in series serve to differentiate this voltage in such a manner that a sharp positive voltage pulse is developed across resistor 35 at the beginning of the square pulse and a sharp negative pulse at the end of the square pulse.

Arc-discharge tube 42 is normally biased to remain nonconductive. If neither of relays 11 and 12 is energized, tube 42 remains nonconductive even in the presence of a voltage pulse across resistor 35, capacitor 46 functioning to absorb any small positive voltage which may inadvertently reach control grid 41 due to stray capacitances in the circuit. If, on the other hand, relay 11 or relay 12 is energized due to the presence of the proper output of ratio bridge 8, the voltage pulse appearing across resistor 35 is applied to control grid 41 of arc-discharge tube 42, thereby rendering this tube conductive. The discharge of tube 42 sets up a chain of events, the final result of which is the energization of relay 52, the closing of contacts 75 and 76 of which causes bomb dropper 14 to release a missile. The energization of this relay also opens contacts 50 and 51, serving to remove the plate voltage from arc-discharge tube 42, thus restoring it to its normal nonconductive condition. The operation of this portion of the circuit is identical with that described in detail in connection with the flare release mechanism of copending application Serial No. 543,494 filed July 4, 1944, Automatic Release and Reset System, William I. L. Wu now Patent No. 2,640,926, issued June 2, 1953.

When tube 42 fires, its cathode 44, and therefore plate 54 of tube 55, becomes positive, thereby causing tube 55 to conduct. Condenser 61 then begins to charge through rheostat 60 and after a predetermined time, dependent on the time constant of condenser 61 and rheostat 60, the potential across condenser 61 reaches the breakdown potential of tube 64. Upon breakdown of tube 64, condenser 66 begins to charge and the voltage built up on condenser 66 is applied to grid 69 of tube 70 causing tube 70 to conduct and thereby trip relay 52.

In one successful embodiment of the invention, arc-discharge tube 42 was a type 2050, while vacuum tubes 55 and 70 each comprised one half of a type 12SL7 and voltage-regulator tube 64 was a type VR-75. The voltage at B+ was 180 volts. Circuit components had the following values:

| | | |
|---|---|---|
| Resistors 21 | ohms | 27,000 |
| Rheostats 22 | megohms | 0.6 |
| Resistors 23, 24, 35 | do | 0.2 |
| Resistors 25, 28, 59, 68 | do | 1.0 |
| Rheostat 26 | do | 6.0 |
| Resistors 27 | do | 2.0 |
| Resistor 43 | do | 0.5 |
| Resistors 45, 57 and rheostat 60 | do | 0.1 |
| Resistor 49 | ohms | 7,500 |
| Resistor 58 | do | 10,000 |
| Resistors 62 | do | 3,000 |
| Resistor 67 | megohms | 5.0 |
| Resistor 72 | ohms | 2,000 |
| Capacitors 29, 30, 61 | microfarads | 2.0 |
| Capacitor 34 | do | 0.03 |
| Capacitor 46 | do | 0.001 |
| Capacitor 66 | do | 0.5 |

It will be understood that tube types and component values different from those stated above may be employed without departing from the scope of the invention. For example, separate vacuum tubes may be employed instead of double triodes such as those mentioned above by way of example.

What is claimed is:

1. In a missile release actuated in response to first and second input signals derived from separated detectors of magnetism: means for combining the input signals to provide a sum signal; means for combining the input signals to provide a difference signal; means connected in series with said sum means for providing a first output signal when the input signals have desired characteristics of amplitude, shape and duration; means, connected in parallel with the first output means and in series with the difference means for combining said sum and difference signals to provide second and third output signals which consist of polarity changes; and means responsive to said first, second and third output signals for releasing a missile only when said first output signal is present, and when one but not both of said second and third output signals is of a certain polarity.

2. In a missile release actuated in response to first and second input signals derived from separated detectors of magnetism: means for combining the input signals to provide a sum signal; means for combining the input signals to provide a difference signal; means connected in series with said sum means for providing a first output signal when the input signals have desired characteristics of amplitude, shape and duration; means, connected in parallel with the first output means and in series with the difference means, for combining said sum and difference signals to provide second and third output signals; and means responsive to said first, second and third output signals for releasing a missile only when said first output signal is present, and when one but not both of said second and third output signals, exceeds a predetermined minimum amplitude.

3. A missile release adapted for the selective release of first and second type missiles in response to first and second input signals derived from separated detectors of magnetism; said release comprising: means for combining the input signals to provide a sum signal; means for combining the input signals to provide a difference signal; means, connected in series with said sum means, for providing a first output signal when the input signals have desired characteristics of amplitude, shape and duration; means, connected in parallel with said first output means and in series with said difference means, for combining said sum and difference signals to provide second and third output signals; means, in series with said first output means, for releasing the first type of missile when said first output signal is present; and means, in series with said first, second and third output means, for releasing the second type of missile only when said first output signal is present, and when one but not both of said second and third output signals exceeds a predetermined minimum amplitude.

4. A missile release adapted for the selective release of first and second type missiles in response to first and second input signals derived from separated detectors of magnetism; said release comprising: means for combining the input signals to provide a sum signal; means for combining the input signals to provide a difference signal; means, in series with said sum means, for providing a first output signal when the input signals have desired characteristics of amplitude, shape and duration; means, in parallel with said first output means and in series with said difference means, for combining said sum and difference signals to provide second and third output signals which consist of polarity changes only; means, in series with said first output means, for releasing the first type of missile when said first output signal is present; and means, in series with said first, second and third output means, for releasing the second type of missile only when said first output signal is present, and when one but not both of said second and third output signals is of a certain polarity.

5. A control mechanism responsive to the relative magnitude of two signals comprising, in combination: means for combining said signals to provide a sum signal; means for combining said signals to provide a difference signal; means, in series with the first mentioned means, for attenuating said sum signal a pre-determined amount; means, to which the attenuating means and difference means are connected in parallel, for combining said difference signal and said attenuated sum signal to produce two output signals, the likeness or unlikeness of whose polarities depends upon whether the ratio of the absolute values of said sum signal and said difference signal exceeded said pre-determined amount; and discriminating means responsive to the polarities of said output signals.

6. A mechanism according to claim 5 wherein said discriminating means is actuated by output signals of unlike polarity.

7. A control mechanism responsive to the relative magnitude of two signals comprising, in combination: means for combining said signals to provide a sum signal; means for combining said signals to provide a difference signal; means for attenuating said sum signal; means, to which the attenuating means and difference means are connected in parallel, for combining said difference signal and said attenuated sum signal in additive and subtractive relation to produce two output signals; and means responsive to said output signals.

8. A mechanism according to claim 7 wherein said last named means is actuated when only one of the output signals exceeds a certain minimum amplitude.

9. In a missile release system having a release mechanism and a pair of separated magnetic field detectors for producing first and second input signals, the combination comprising; means for combining the signals to provide a sum signal; means for combining the signals to provide a difference signal; means for attenuating said sum signal a pre-determined amount; means, to which the attenuating means and difference means are connected in parallel, for combining said difference signal and said attenuated sum signal to produce two output signals, the likeness or unlikeness of whose polarities depends upon whether the ratio of the absolute values of said sum signal and said difference signal exceeded said pre-determined amount; and discriminating means responsive to the polarities of said output signals for actuating the release mechanism.

10. In a missile release having a release mechanism and a pair of separated magnetic field detectors for producing first and second input signals, the combination comprising: means for combining the signals to provide a sum signal; means for combining the signals to provide a difference signal; means for attenuating said sum signal;

means for combining said difference signal and said attenuated sum signal in additive and subtractive relation to produce two output signals; and means responsive to said output signals for actuating the release mechanism.

11. The combination according to claim 9 wherein said discriminating means is actuated by output signals of unlike polarity.

12. The combination according to claim 10 wherein said last named means is actuated when only one of the output signals exceeds a certain minimum amplitude.

References Cited in the file of this patent

UNITED STATES PATENTS

| | | |
|---|---|---|
| 1,676,847 | Zuschlag | July 10, 1928 |
| 1,812,392 | Zuschlag | June 30, 1931 |
| 1,968,068 | Blanchard | July 31, 1934 |
| 2,161,081 | Ovtschinnikoff | June 6, 1939 |
| 2,299,313 | Durgin | Oct. 20, 1942 |
| 2,368,953 | Walsh | Feb. 6, 1945 |
| 2,404,387 | Lovell | July 23, 1946 |
| 2,406,870 | Vacquier | Sept. 3, 1946 |
| 2,412,003 | Neufeld | Dec. 3, 1946 |
| 2,483,417 | Johnson | Oct. 4, 1949 |